July 18, 1950  H. C. GLITSCH  2,515,507
CLOSURE CLAMP
Filed May 23, 1947

Inventor
HANS C. GLITSCH

By Ahley & Ahley
Attorney

Patented July 18, 1950

2,515,507

UNITED STATES PATENT OFFICE 2,515,507

CLOSURE CLAMP

Hans C. Glitsch, Dallas, Tex., assignor to Glitsch Engineering Company, Dallas, Tex., a partnership Application May 23, 1947, Serial No. 749,990

3 Claims. (Cl. 292—195)

This invention relates to new and useful improvements in closure clamps.

The invention has particularly to do with an improved clamp for removably securing together, the overlapping edge portions of a plate-like frame and a plate-like closure, such as manways for the tray floors of refinery towers.

One object of the invention is to provide an improved clamp which is permanently attached to the plate-like or flat closure and adapted to be partially rotated to frictionally engage the under or inner surface of the flat frame, while maintaining a purchase point on the under or inner surface of said closure.

A further object of the invention is to provide an improved clamp having a stud passing through a washer and clamp member, spaced from the washer; the washer and member being welded or suitably secured on the stud, which latter has wrench ends, whereby a tool may be applied to rotate the stud.

Another object of the invention is to provide an improved clamp including a stud having a washer and a clamp member welded or fastened thereon; the clamp member having a purchase lug at one end and a friction face at its opposite end and being spaced from the washer a distance slightly less than the combined thickness of the overlapping flat plates, whereby the purchase lug bearing against the under or inner surface of the closure plate, will force the friction face into binding contact with the under or inner surface of the frame plate and draw the plates together when the stud is turned.

A construction designed to carry out the invention will be hereinafter described together with other features of the invention.

Figure 2:
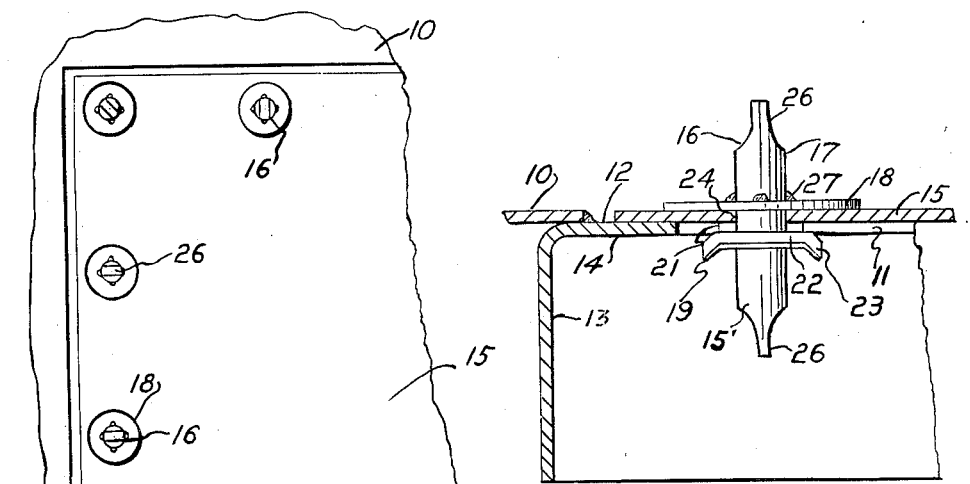
Figure 3:
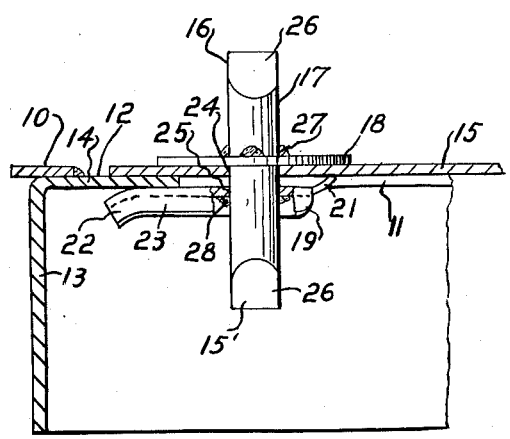
Figure 4:
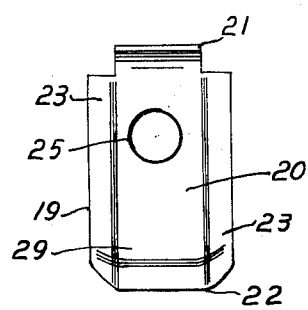

The invention will be more readily understood from a reading of the following specification and by reference to the accompanying drawing, wherein an example of the invention is shown, and wherein:

Fig. 1 is a plan view of a portion of a manway fastened in a refinery tray floor by clamps constructed in accordance with the invention, Fig. 2 is a transverse, vertical, sectional view of one side of a manway with one of the clamps in elevation and in its unfastened position, Fig. 3 is a view similar to Fig. 2, showing the clamp fastened, and Fig. 4 is a plan view of the clamp member.

In the drawing, the numeral 10 designates a portion of one of the tray floors of a refining tower having a manway or opening 11 formed therein. The manway 11 is shown as substantially square and is surrounded by an underlying frame 12 which may be formed of angle beams 13 having their horizontal, upper flanges 14 projecting inwardly of the margins of said manway. A suitable closure plate 15, preferably flat, rests upon the frame 12 with its flat marginal portions overlapping and secured to said frame by a plurality of friction clamps 16.

Each clamp 16 includes generally, a stud 17, a circular washer 18 and an elongate clamp member 19 (Figs. 2 and 3). The clamp member is of particular construction and includes a longitudinal central web 20, flat throughout its length, except at its ends. At one end, the web is curved upwardly to form an upstanding purchase lug 21; while the opposite end of the web is curved downwardly to provide a clearance lip 22. Outwardly and downwardly bent wings 23 extend along each side of the web 20 from the lip 22 to the base of the lug 21 to give the member the desired rigidity or stability. The member is made of resilient metal, such as thin steel, and the wings are inclined transversely so that the member remains slightly resilient.

The vertical, cylindrical stud 17 extends centrally through the washer 18 and through an aperture 24 in the closure 15, adjacent the edge of the frame 12, as well as through an opening 25 in the web 20 adjacent the lug 21. This leaves the major portion of the web extending radially from the stud, opposite the lug. The stud projects above the washer and below the clamp member and its ends are reduced and flattened to form wrench ends or faces 26, whereby a wrench or other tool (not shown) may be applied to either end to rotate said stud and permit opening and closing of the manway from either side.

The stud is fastened to the upper surface of the washer by tack welds 27 and to the under surface of the web 20 by tack welds 28. In welding the washer and clamp member to the stud, these elements are spaced apart on the stud a distance equal to slightly less than the combined thicknesses of the closure 15 and the frame 12. The parts may be held in this position by any suitable means. Thus, when the clamp member is rotated from the position shown in Fig. 2 to the clamping position shown in Fig. 3, the clamping end of said member will be sprung downwardly, whereby the frictional clamping face 29 on the upper surface of the web frictionally engages the under surface of the frame 12 and the closure is tightly clamped on said frame, the lug 21 acting as a purchase point. The downturned lip 22 provides clearance, whereby the face 29 may readily ride under the edge of the frame 12.

It is obvious that a quarter turn of the stud 17 is sufficient to move the clamp to either of the positions shown in Figs. 2 and 3. The washer 18, of course, rotates with the stud and being of a sizable diameter provides a broad bearing surface on the closure. The clamp is simple and obviates the use of screw threads and nuts and is not subject to loosening due to vibration. Scrap metal may be used in making the clamp and no machine work is required.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A clamp for frictionally fastening a closure to the frame of a manway including, a stud adapted to be rotatably mounted in the marginal portion of the closure with its ends projecting on opposite sides thereof, wrench faces formed on the ends of the stud, a washer surrounding and secured to the medial portion of said stud and adapted to engage the upper surface of the closure, and a clamping member secured on said stud in spaced underlying relation to the washer, the member having a purchase element at one end adapted to engage the underside of the closure and a flat friction face at its opposite end adapted to engage the underside of the manway frame when the stud is rotated, said washer being of relatively large diameter so as to overlie the purchase element, the major portion of the friction face and a portion of the manway frame.

2. A clamp for a closure including, a stud, a washer permanently secured around the medial portion of the stud on one side of the closure, and an elongate clamping member on the opposite side of the closure having an upstanding purchase lug at one end and a downturned lip at its opposite end, the member being secured on said stud and spaced from the washer a distance slightly less than the thickness of the parts to be clamped, said washer being of sufficient area to overlie the major portion of said member and its lug.

3. A clamp for a closure including, a cylindrical stud having reduced wrench ends, a washer on one side of the closure welded to the medial portion of the stud, and an elongate clamp member including a longitudinal web having an upturned purchase lug at one end and a downturned lip at its opposite end and downwardly inclined wings along each side of the web, said web having a frictional clamping face adjacent its lip, the member being welded to the medial portion of said stud and spaced from the washer a distance slightly less than the thickness of the parts to be clamped and disposed on the opposite side of the closure, said washer being of relatively large size so as to overlie the lug and the major portion of the frictional clamping face of said member.

HANS C. GLITSCH.

REFERENCES CITED

The following references are of record in the file of this patent:

UNITED STATES PATENTS

| Number | Name | Date |
| --- | --- | --- |
| 247,531 | Baumberger | Sept. 27, 1881 |
| 1,783,150 | Jeffery | Nov. 25, 1930 |
| 2,178,363 | Schatzman | Oct. 31, 1939 |
| 2,184,674 | Jorgensen | Dec. 26, 1939 |
| 2,409,822 | Allen | Oct. 22, 1946 |